United States Patent
Kim (10) Patent No.: US 8,318,341 B2
(45) Date of Patent: Nov. 27, 2012

(54) POUCH-TYPE SECONDARY BATTERY

(75) Inventor: Joongheon Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/465,989

(22) Filed: May 7, 2012

(65) Prior Publication Data

US 2012/0219851 A1 Aug. 30, 2012

Related U.S. Application Data

(60) Division of application No. 12/979,217, filed on Dec. 27, 2010, which is a continuation of application No. 12/173,143, filed on Jul. 15, 2008.

(30) Foreign Application Priority Data

Jul. 20, 2007 (KR) ........................ 10-2007-0072844

(51) Int. Cl.
  *H01M 2/08* (2006.01)
  *H01M 2/04* (2006.01)
  *H01M 6/12* (2006.01)
  *H01M 2/00* (2006.01)

(52) U.S. Cl. ......... 429/175; 429/162; 429/163; 429/176

(58) Field of Classification Search .................. 429/162, 429/163, 175, 176
See application file for complete search history.

(56) References Cited

U.S. PATENT DOCUMENTS

| 6,358,644 B1 | 3/2002 | Shibata et al. |
| 6,451,476 B1 | 9/2002 | Chang et al. |
| 6,482,544 B1 | 11/2002 | Shiota et al. |
| 2005/0142439 A1 | 6/2005 | Lee et al. |
| 2006/0073383 A1 | 4/2006 | Han et al. |
| 2006/0105237 A1 | 5/2006 | Oh |
| 2007/0141452 A1 | 6/2007 | Kim |
| 2011/0091764 A1 | 4/2011 | Kim |

FOREIGN PATENT DOCUMENTS

| CN | 1610166 | 4/2005 |
| CN | 1866580 | 11/2006 |
| EP | 0 138 790 | 4/1985 |
| EP | 0 845 821 | 6/1998 |

(Continued)

OTHER PUBLICATIONS

Certified Human Translation of JP 2003-151646 originally published May 2003 to Takahashi.*

(Continued)

*Primary Examiner* — Basia Ridley
*Assistant Examiner* — Jonathan G Leong
(74) *Attorney, Agent, or Firm* — Knobbe, Martens, Olsen & Bear, LLP (57) ABSTRACT

A pouch-type secondary battery including: an electrode assembly having a first electrode plate, a second electrode plate, and a separator disposed therebetween; and a pouch case including a first case part having a pouch to house the electrode assembly, a second case part disposed over an open end of the pouch, and sealing portions to seal the second case part to the first case part. The sealing portions include wing portions that are bent to cover opposing sides of the pouch, and bent portions that are bent from the wing portions, to cover a bottom surface of the pouch.

10 Claims, 5 Drawing Sheets

FOREIGN PATENT DOCUMENTS

| | | |
|---|---|---|
| EP | 1 139 456 | 10/2001 |
| JP | 11-067167 A | 3/1999 |
| JP | 11-260327 | 9/1999 |
| JP | 2001-118547 A | 4/2001 |
| JP | 2001-210358 | 8/2001 |
| JP | 2001-250516 A | 9/2001 |
| JP | 2002-025512 A | 1/2002 |
| JP | 2003-151646 A | 5/2003 |
| JP | 2003151646 A * | 5/2003 |
| JP | 2005-339811 | 12/2005 |
| JP | 2006-156161 | 6/2006 |
| JP | 2006-196217 | 7/2006 |
| JP | 2006-202652 A | 8/2006 |
| JP | 2006-261128 | 9/2006 |
| KR | 10-1999-0002558 | 3/1999 |
| KR | 1020030096718 | 12/2003 |

OTHER PUBLICATIONS

Machine Translation of KR1020030096718 including Human Translation of Abstract originally published to Kim et al. Dec. 2003.
Machine Translation of JP 2003-151646 originally published May 2003 to Yoshiaki.
European Examination Report dated Feb. 23, 2012, EP Application No. 08 252 470.3-1227, 6 pages.
Japanese Office Action dated Dec. 6, 2001 for corresponding Japanese Application No. 2008-188883, 2 pages.
Notice of Allowance issued in Korean Patent Application No. 2007-72844 on Nov. 14, 2008.

* cited by examiner

POUCH-TYPE SECONDARY BATTERY

CROSS-REFERENCE TO RELATED APPLICATIONS

This application is a divisional of U.S. patent application Ser. No. 12/979,217, filed on Dec. 27, 2010 and entitled, "POUCH-TYPE SECONDARY BATTERY," which is a continuation of U.S. patent application Ser. No. 12/173,143, filed on Jul. 15, 2008, and entitled, "POUCH-TYPE SECONDARY BATTERY HAVING A SECOND COVER," which claims the benefit of Korean Application No. 2007-72844 filed Jul. 20, 2007, in the Korean Intellectual Property Office, the entirety of each of which is incorporated herein by reference.

BACKGROUND OF THE INVENTION

1. Field of the Invention

Aspects of the present invention relate to a pouch-type secondary battery including a pouch case having bent sealing portions, to cover edges of a battery cell, and to buffer external impacts.

2. Description of the Related Art

Generally, a lithium polymer battery refers to a battery including an electrode assembly, which includes a separator disposed between a positive plate and a negative plate. The separator electrically isolates the plates, and includes an ion-conducting medium, i.e., an electrolyte. Such a separator is formed of a gel polymer that is impregnated with the electrolyte, in order to improve ionic conductivity. The gel polymer electrolyte provides various advantages, such as, excellent adhesion to electrodes, superior mechanical properties, and ease of manufacturing, in addition to improved ionic conductivity.

A lithium polymer battery can be fabricated in the form of a plate-like structure, so there is no need to adopt a winding process, which is necessarily involved in manufacturing some lithium ion batteries. As a result, the electrode assembly can be in the form of a stacked, plate-like structure, and it is also possible to fabricate the electrode assembly as a square-shaped structure. Further, there is substantially no electrolyte exposed to the outside, due to an internal injection of the electrolyte into the cell, which is fabricated as an integral structure. In addition, the electrode assembly can be processed into a plate-like structure, so there is no need to apply pressure to shape the electrode assembly into a rectangular structure. Consequently, it is possible to use a thin and flexible pouch case instead of a thicker, harder square-shaped, or cylindrical can to house the battery.

As discussed above, when the flexible pouch case is used, it is possible to significantly reduce a thickness of the battery, as compared to using a can. As a result, it is possible to form much larger numbers of the electrode assemblies in the same volume. That is, the battery capacity can be greatly increased. Further, due to the flexibility of the pouch case, it is possible to easily fabricate the battery in a desired form. Therefore, the thus-fabricated battery is readily mounted in a variety of electronic devices.

However, despite the increased battery capacity and shapeability, a pouch case suffers from problems associated with poor mechanical strength, and is thereby vulnerable to external impacts. In particular, when a large-area pouch-type secondary battery is dropped, a relatively greater impact force is applied to edges of the battery. Impacts to the edges of the battery result in various problems, such as, tearing of the pouch case by the electrode assembly, and opening of sealing portions of the pouch case.

SUMMARY OF THE INVENTION

Aspects of the present invention provide a pouch-type secondary battery having a structure that is impact resistant.

Aspects of the present invention provide a pouch-type secondary battery comprising: an electrode assembly including a first electrode plate, a second electrode plate, and a separator disposed therebetween; and a pouch case including a first case part having a pouch to house the electrode assembly, and a second case part to seal the electrode assembly in the first case part.

According to aspects of the present invention, the pouch case includes sealing portions. The sealing portions include wing portions to cover opposing sides of the pouch, and bent portions to cover opposing edges of the pouch.

According to aspects of the present invention, the bent portions may be folded around the edges of the pouch, such that the ends of the bent portions face each other, and partially cover a side of the pouch formed by the second case. The wing portions and bent portions can be generally flat. The bent portions can be bent from the wing portions at a substantially right angle (90°).

According to aspects of the present invention, spaces may be formed between the bent and wing portions, and the covered edges of the pouch.

According to aspects of the present invention, the wing portions may be rounded, and the radius of curvature of the wing portions may be less than the radius of curvature of the edges of the pouch.

According to aspects of the present invention, the interface between the wing portions and the bent portions may be chamfered, and the wing portions may be rounded.

According to aspects of the present invention, the bent portions a re corrugated, include alternate convexities and concavities, and only the central portions of the concavities contact the pouch. The pouch case may include a third case part to cover a bottom side of the pouch and portions of the wing portions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. Those skilled in the art will appreciate that various modifications, additions and substitutions are possible without departing from the scope and spirit of the invention as disclosed in the accompanying claims. Unless otherwise defined, all technical and scientific terms used herein have the same meaning as commonly understood, by one of ordinary skill in the art to which this invention belongs. It will be further understood that terms, such as those defined in commonly used dictionaries, should be interpreted as having a meaning that is consistent with their meaning in the context of the specification and relevant art, and should not be interpreted in an idealized or overly formal sense, unless expressly so defined herein. Well-known functions or constructions may not be described in detail for brevity and/or clarity.

Figure 1A:
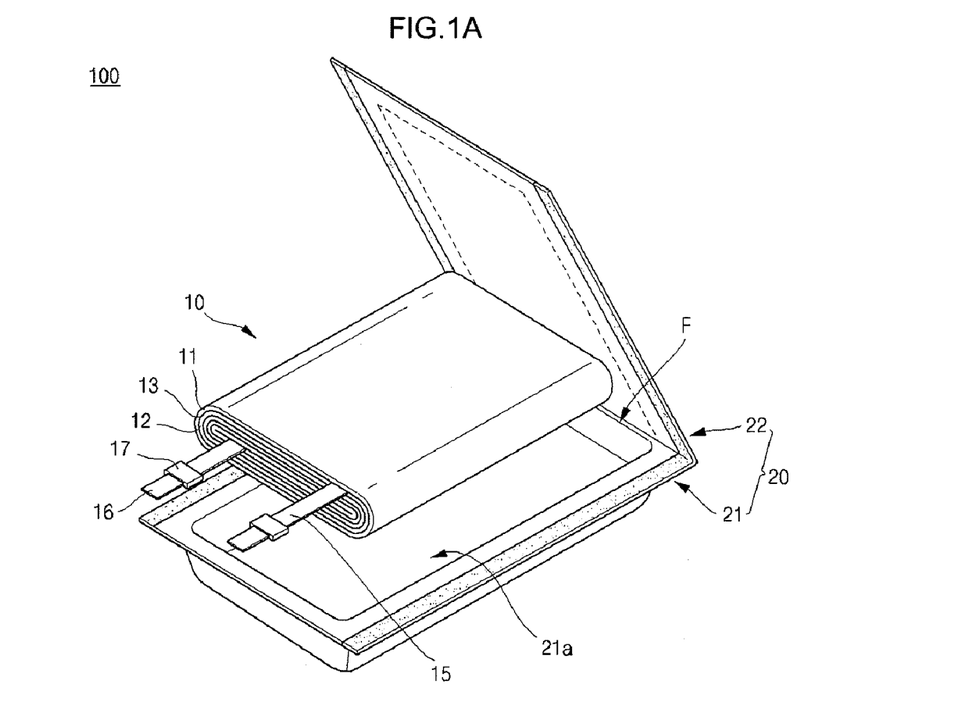
FIG. 1A is a schematic exploded perspective view of a pouch-type secondary battery, in accordance with an exemplary embodiment of the present invention.
Figure 1B:
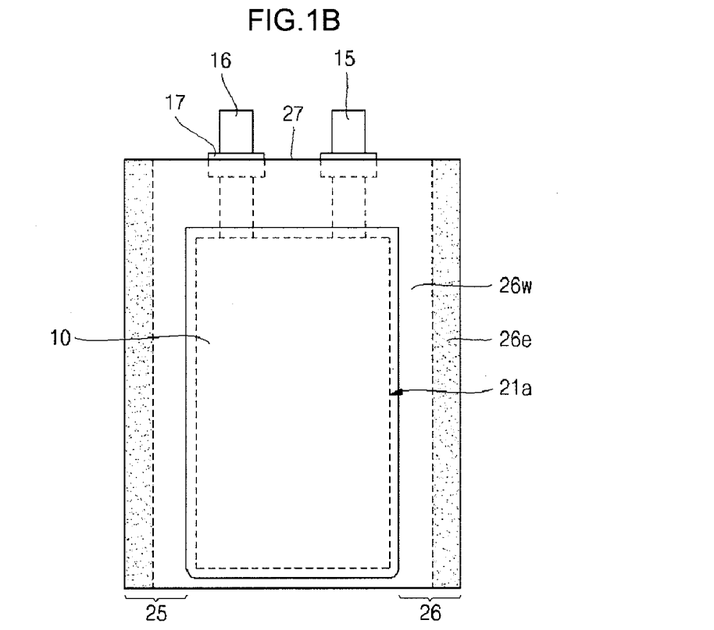
FIG. 1B is a plan view showing a partially assembled version of the secondary battery of FIG. 1A, as viewed from the bottom.

FIG. 1A is a schematic exploded perspective view of a pouch-type secondary battery 100, in accordance with an exemplary embodiment of the present invention, and FIG. 1B is a plan view showing a partially assembled version of the secondary battery 100. Referring to FIGS. 1A and 1B, the pouch-type secondary battery 100 includes: an electrode assembly 10 including a positive plate 11, a negative plate 12, and a separator 13 disposed therebetween; a pouch case 20 to house the electrode assembly 10, comprising a first case part 21 and a second case part 22 (first cover). The first case part 21 has a pouch 21a to receive the electrode assembly 10. The first and second case parts 21, 22 are folded together, and then attached to one another, to secure the electrode assembly 10 in the pouch case 20.

The positive plate 11 and the negative plate 12 include electrode active material layers (not shown) on surfaces of electrode current collectors (not shown). The separator 13 is impregnated in an organic electrolyte. The electrode assembly 10 is formed by winding the positive plate 11, the negative plate 12, and the separator 13 into a jelly roll-type structure.

The positive plate 11 is fabricated by applying a positive electrode active material layer, containing a lithium-based oxide as a main ingredient, to both sides of a positive electrode current collector formed of a thin aluminum foil. Both ends of the positive electrode current collector are provided with positive electrode uncoated areas, on which the positive electrode active material layer is not coated.

The negative plate 12 is fabricated by applying a negative electrode active material layer, containing a carbon material as a main ingredient, to both sides of a negative electrode current collector formed of a thin copper foil. Both ends of the negative electrode current collector are provided with negative electrode uncoated areas, on which the negative electrode active material layer is not coated.

A positive electrode tap 15 is formed on one side of the positive plate 11. A negative electrode tap 16 is formed on one side of the negative plate 12. The positive electrode tap 15 and the negative electrode tap 16 are arranged parallel to each other. Portions of the positive electrode tap 15 and the negative electrode tap 16 are exposed outside of the pouch case 20, such that the electrode assembly 10 can be electrically connected to an external device.

The positive electrode tap 15 and the negative electrode tap 16 are generally formed of a metal, such as aluminum, copper, or nickel, and should have a sufficient electrical conductivity to minimize a voltage drop. The positive electrode tap 15 and the negative electrode tap 16 are large enough to accommodate a significant amount of an electric current, at a low level of resistance. Generally, the positive electrode tap 15 is formed of aluminum and the negative electrode tap 16 is formed of nickel.

Insulating tapes 17 are disposed on portions of the electrode taps 15, 16, which extend through the pouch case 20, when the pouch case 20 is sealed. The insulating tapes 17 serve to prevent short-circuits between the electrode taps 15, 16, and/or the pouch case 20.

The insulating tape 17 may be formed of a composite material having excellent insulating performance, heat-resistance, and durability. More specifically, the insulating tape 17 may be formed of a composite material in which an organic material layer (not shown) formed of a resin is mixed with an inorganic material (not shown), having a melting point that is higher than that of the resin. Therefore, the insulating tape 17 is capable of maintaining the insulating function, even when the organic material layer is melted, and/or lost, due to high fusion bonding temperatures applied to seal the pouch case 20.

The pouch case 20 is divided into two parts, i.e., the first case part 21 and the second case part 22, at the folding line F. The pouch 21a is formed in the center of the first case part 21, via a conventional method, such as, press-processing, or the like.

The pouch case 20 may be formed of a metal thin film, for example, an aluminum thin film. An insulating layer of a resin, or nylon, may be formed on an outer surface of the pouch case 20, to protect the metal thin film from damage, and/or external electrical contacts.

A thermo-adhesive resin (not shown) of an organic material, such as, polypropylene, polyethylene, or the like can be coated onto an inner surface of the pouch 20. For example, a cast polypropylene (CPP) may be used as the adhesive resin. The CPP layer may be formed of a composite of the organic material and inorganic material particles.

The pouch case 20 is sealed by folding the first case part 21 onto the second case part 22, then applying heat and pressure to fuse the CPP layers formed on inner surfaces of the first case part 21 and the second case part 22. More specifically, the fusing forms sealing portions 25, 26, 27, which extend around three sides of the pouch case 20.

Figure 1C:
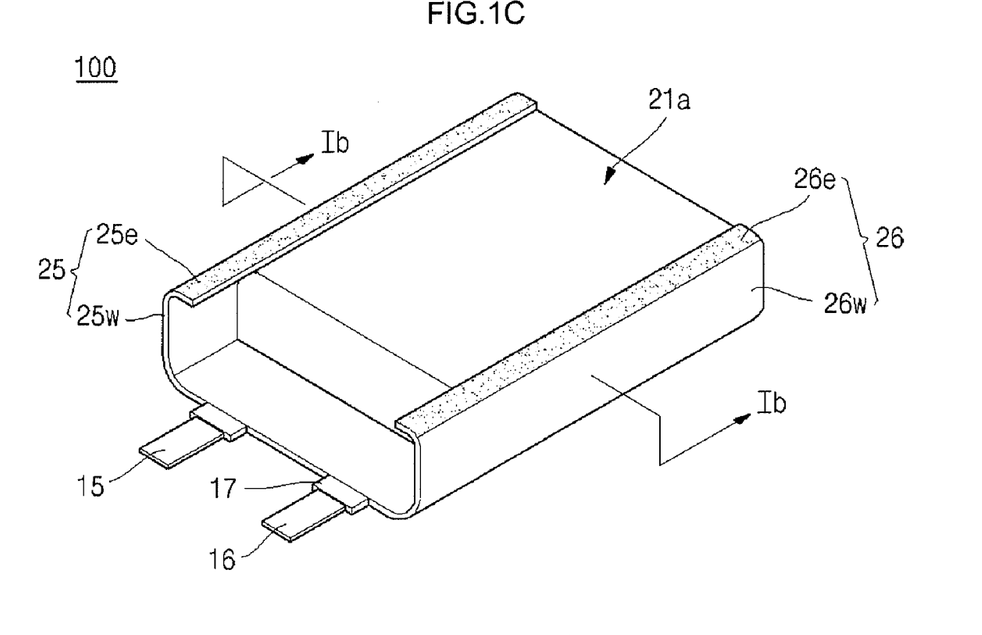
FIG. 1C is a schematic perspective view of a pouch-type secondary battery, in accordance with an exemplary embodiment of the present invention.
Figure 1D:
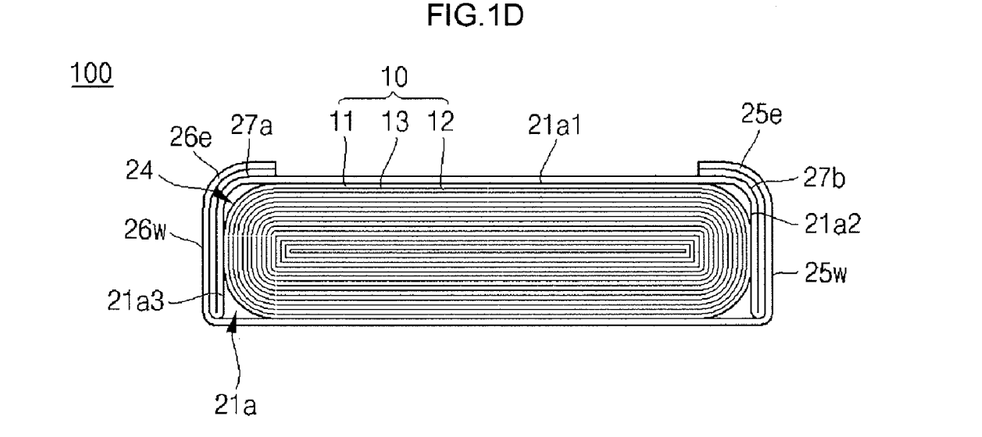
FIG. 1D is a cross-sectional view taken along line Ic-Ic of FIG. 1C.

FIG. 1C is a schematic perspective view of the pouch-type secondary battery 100, after further processing in accordance with an exemplary embodiment of the present invention, and FIG. 1D is a cross-sectional view taken along line Ic-Ic of FIG. 1C. Referring to FIGS. 1C and 1D, the pouch-type secondary battery 100 is configured such that the sealing portions 25, 26 (shown in FIG. 1A) are bent around two opposing sides of the electrode assembly 10. More specifically, both sides of the pouch 21a are surrounded by the sealing portions 25, 26.

The sealing portions 25, 26 include wing portions 25w, 26w, and bent portions 25e, 26e, respectively. The wing portions 25w, 26w, are folded, so as to cover opposing sides 21a2, 21a3 of the pouch 21a. The bent portions 26e, 25e are folded away from the wing portions 25w, 26w, to cover opposing edges 27a, 27b of the pouch 21a, and to partially cover a bottom surface 21a1 of the pouch 21a. As referred to herein, "bottom" and "top" surfaces are used for convenience, and do not limit the present teachings to any particular orientation.

According to aspects of the present embodiment, it is possible to achieve greater protection of the electrode assembly 10, because the sealing portions 25, 26 cover the edges 27a, 27b of the pouch 21a, and the sides 21a2, 21a3 of the pouch 21a. Therefore, it is possible to absorb impacts applied to edges of the pouch-type secondary battery 100. In particular, it is possible to enhance buffering effects against impacts, in a case of large-area pouch-type secondary batteries, which generally have edges which are susceptible to relatively large impacts, when dropped.

Referring to FIG. 1D, the bent portions 25e, 26e extend from the wing portions 25w, 26w. The bent portions 26e, 25e are bent such that ends thereof face one another. In other words, the bent portions 25e, 26e partially cover the bottom surface 21a1 of the pouch 21a, and reinforce the corners 27a, 27b of the pouch 21a. Therefore, the pouch 21a is further firmly supported, to prevent movement or shaking of the electrode assembly 10 inside the pouch 21a, which may occur upon application of external impacts. As a result, tearing of the pouch case 20, or opening of the sealing portions 25, 26, may be prevented.

The bent portions 25e, 26e are bent to a substantially right angle (90°), with respect to the wing portions 25w, 26w. If the aforesaid angle is smaller than 90°, the buffering action may be decreased. On the other hand, if such an angle is larger than 90°, the pouch 21a may not be properly supported, which may result in tearing of the pouch, or opening of the sealing portions 25, 26, if the pouch-type secondary battery 100 is impacted.

Figure 2:
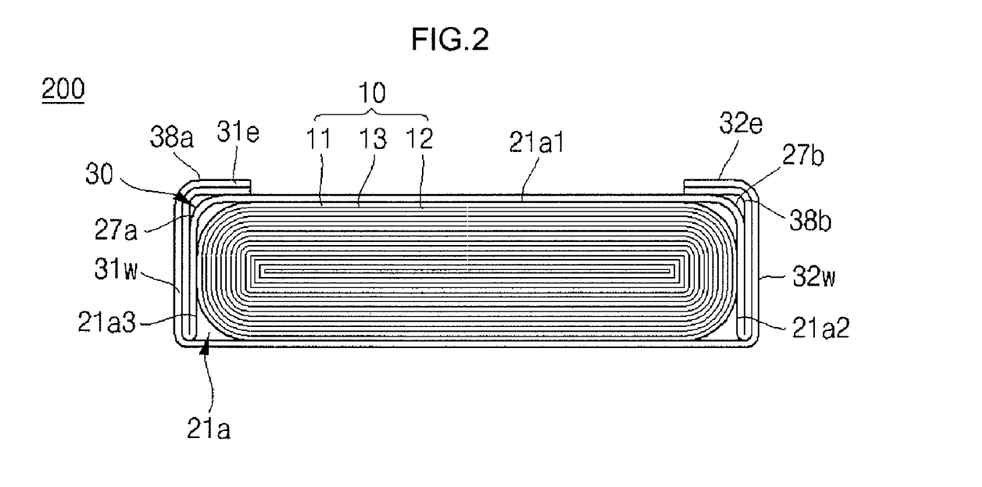
FIG. 2 is a cross-sectional view of a pouch-type secondary battery, in accordance with another exemplary embodiment of the present invention.

FIG. 2 is a cross-sectional view of a pouch-type secondary battery 200, in accordance with another exemplary embodiment of the present invention. Referring to FIG. 2, the pouch-type secondary battery 200 includes wing portions 31w, 32w and bent portions 31e, 32e that are bent from the wing portions 31w, 32w. The bent portions 31e, 32e differ from the bent portions 25e, 26e, of the pouch-type secondary battery 100.

Folds 38a, 38b, are formed between the bent portions 31e, 32e and the wing portions 31w, 32w, and are spaced at a given distance from edges 27a, 27b of a pouch 21a. That is, air cushions 30 to absorb impacts are formed between the folds 38a, 38b and the edges 27a, 27b.

The folds 38a, 38b, may be rounded by a rounding process. The curvature radius of the folds 38a, 38b is set to be smaller than that of the edges 27a, 27b. If the curvature radius of the folds 38a, 38b is larger than that of the edges 27a, 27b, the folds 38a, 38b will contact the edges 27a, 27b, such that the air cushions 30 are not formed.

Even though not shown in FIG. 2, the folds 38a, 38b may be formed by a chamfering process, rather than the rounding process. That is, the folds 38a, 38b may be formed to have a rounded or chamfered structure. As mentioned above, due to the formation of the air cushions 30 between the edges 27a, 27b and the folds 38a, 38b, the pouch-type secondary battery 200 can further reduce damage, due to impacts applied to the pouch-type secondary battery 200.

Figure 3A:
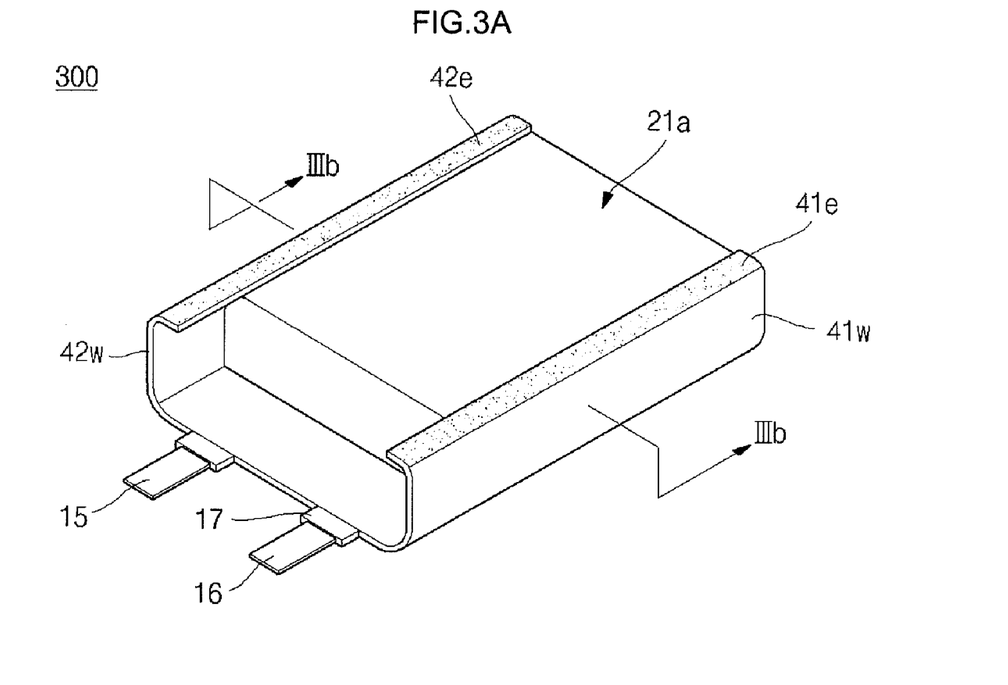
FIG. 3A is a schematic cross-sectional view of a pouch-type secondary battery, in accordance with an exemplary embodiment of the present invention.
Figure 3B:
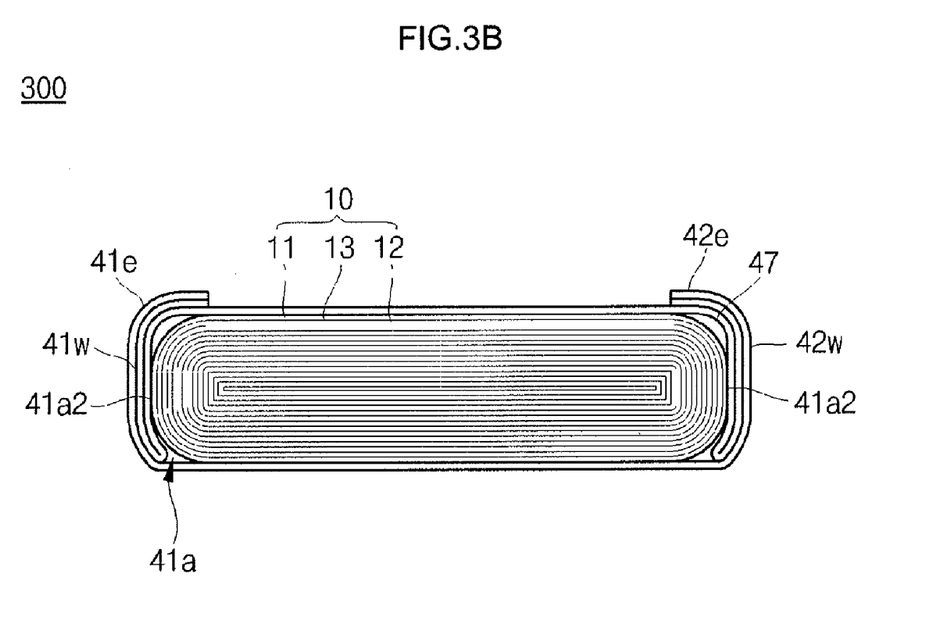
FIG. 3B is a cross-sectional view taken along line IIIb-IIIb of FIG. 3A.

FIG. 3A is a schematic cross-sectional view of a pouch-type secondary battery 300, in accordance with another exemplary embodiment of the present invention, and FIG. 3B is a cross-sectional view taken along line IIIb-IIIb of FIG. 3A. The pouch-type secondary battery 300 is configured to have a pouch 41a and wing portions 41w, 42w that are different from those of the previous exemplary embodiments. The battery 300 also includes bent portions 41e, 42e that extend from the wing portions 41w, 42w, onto the bottom of the pouch 41a.

Referring to FIGS. 3A and 3B, the wing portions 41w, 42w and opposing sides 41a2 of the pouch 41a are subjected to a rounding process, such that the wing portions 41w, 42w are rounded to match the curvature of the sides 41a2 of the pouch 41a. More specifically, edges of the wing portions 41w, 42w and corresponding edges 47 of the pouch 41a are curved, such that there is no separation between the wing portions 41w, 42w and the sides 41a2 of a pouch 41a. As a result, the wing portions 41w, 42w can absorb additional impact energy. The curvature of the wing portions 41w, 42w allows for the size of the pouch 41a to be increased, which allows for a larger electrode assembly 10 to be received therein, thereby further enhancing a capacity of the secondary battery 300.

Figure 4:
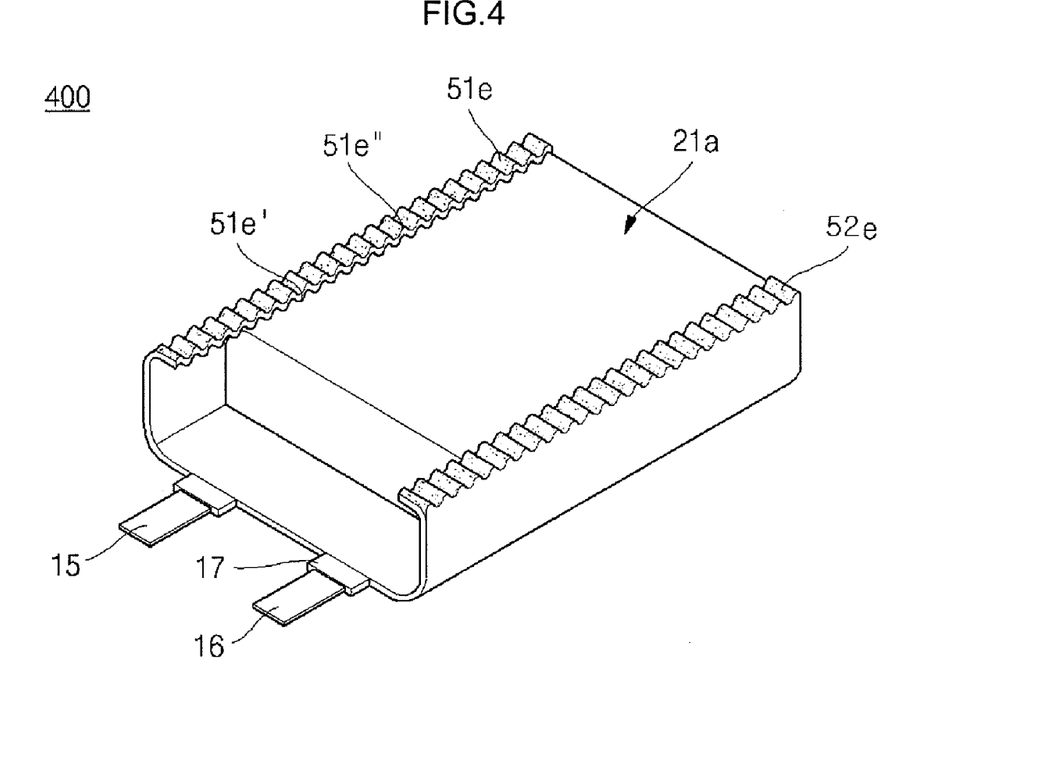
FIG. 4 is a schematic perspective view of a pouch-type secondary battery, in accordance with an exemplary embodiment of the present invention.

FIG. 4 is a schematic perspective view of a pouch-type secondary battery 400, in accordance with an exemplary embodiment of the present invention. The pouch-type secondary battery 400 is configured to have different bent portions 51e, 52e than the previous embodiments.

Referring to FIG. 4, the bent portions 51e, 52e are corrugated with repeating convexities 51e' and concavities 51e". Only the central portions of concavities 51e" contact a bottom surface 51a1 of a pouch 51a. As a result, it is possible to further increase the absorption of impacts, which consequently further improves the stability of the pouch-type secondary battery 400.

Figure 5A:
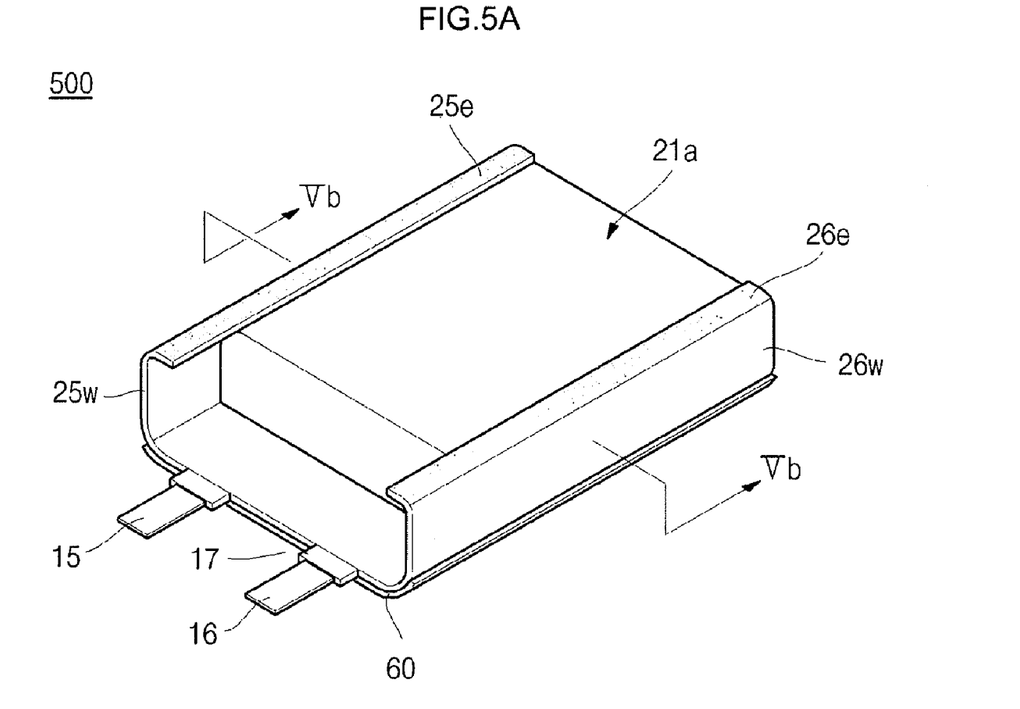
FIG. 5A is a schematic perspective view of a pouch-type secondary battery, in accordance with an exemplary embodiment of the present invention.
Figure 5B:
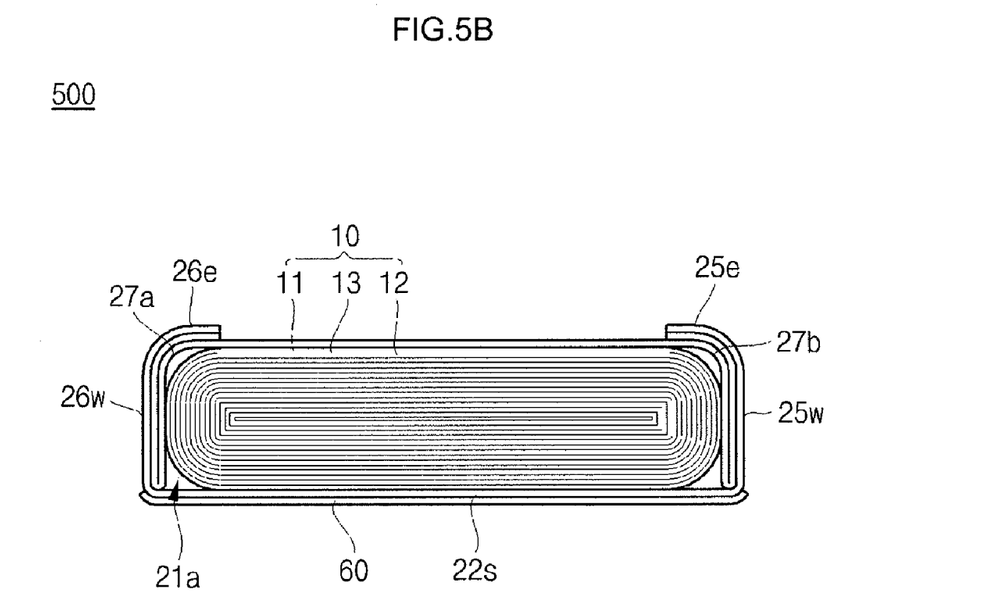
FIG. 5B is a cross-sectional view taken along line Vb-Vb of FIG. 5A.

FIG. 5A is a schematic perspective view of a pouch-type secondary battery 500, in accordance with yet another exemplary embodiment of the present invention, and FIG. 5B is a cross-sectional view taken along line Vb-Vb of FIG. 5A.

Referring to FIGS. 5A and 5B, the pouch-type secondary battery 500 includes a third case 60 (second cover), which is disposed upon an upper surface 22s of the secondary battery 500. The third case covers edges 29a, 29b of the secondary battery 500. Therefore, edges 27a, 27b, 29a, 29b of the secondary battery 500 are supported, by the bent portions 25e, 26e and the third case 60, thereby further enhancing impact-alleviating effects on the edges.

As is apparent from the above description, the present invention can enhance buffering effects against impacts, even in a large-area pouch-type secondary battery, which is susceptible to relatively greater impact on edges of the battery. Seal portions support a pouch of a pouch case, and prevent the tearing and/or opening of the pouch case.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A pouch-type secondary battery, comprising:
   an electrode assembly comprising:
      a first electrode plate;
      a second electrode plate; and
      a separator disposed between the first electrode plate and the second electrode plate; and a pouch case comprising:
- a pouch having a bottom and opposing sides to house the electrode assembly, the bottom and opposing sides being joined at a plurality of pouch corners;
- a first cover disposed upon the opposing sides of the pouch; and
- sealing portions to seal the first cover to the pouch, wherein the sealing portions comprise:
- wing portions that are folded toward the pouch at first folds of the sealing portions and cover the opposing sides of the pouch; and
- bent portions that extend from the wing portions at second folds of the sealing portions so as to partially cover the bottom of the pouch;

wherein the second folds of the sealing portions have a smaller radii of curvature than the radii of curvature of the plurality of pouch corners.

2. The battery according to claim 1, wherein the wing portions are spaced at a given distance from the pouch corners.

3. The battery according to claim 1, further comprising a plurality of air cushions positioned between the sealing portions and at least one of the plurality of pouch corners.

4. The battery according to claim 3, wherein the plurality of air cushions are positioned adjacent to the second sealing portion folds and the pouch corners.

5. The battery according to claim 3, wherein the plurality of air cushions are positioned adjacent the pouch bottom.

6. A pouch-type secondary battery, comprising:
an electrode assembly; and
a pouch case comprising:
- a pouch having a bottom and sidewalls joined at corners and an opening opposite the pouch bottom to receive the electrode assembly; and
- a cover dimensioned to cover the pouch opening;
- wherein the pouch and cover are attached at a plurality of sealing portions extending from the cover and pouch sidewalls;
- wherein the plurality of sealing portions are folded at first folds to cover the pouch sidewalls and folded at second folds to cover pouch corners; and wherein the second folds of the sealing portions have a radii of curvature less than the radii of curvature of the pouch corners.

7. The battery of claim 6, wherein the pouch and the cover are continuously formed and positioned on opposing sides of a fold at a common edge of the pouch and cover.

8. The battery of claim 6, wherein the sealing portions cover a portion of the pouch bottom.

9. The battery of claim 6, further comprising a void space between the second folds of the sealing portions and the pouch corners.

10. The battery of claim 9, further comprising a void space positioned inward of the second folds of the sealing portions and adjacent the pouch bottom.

* * * * *